United States Patent [19]

Sawa et al.

[11] 3,914,482
[45] Oct. 21, 1975

[54] DECORATIVE SYNTHETIC RESIN BRAIDING

[75] Inventors: Hiroshi Sawa, Nagoya; Isamu Aratani, Inazawa; Koji Narita, Nagoya, all of Japan

[73] Assignee: Inoue Rubber Company, Ltd., Japan

[22] Filed: July 30, 1973

[21] Appl. No.: 384,079

[30] Foreign Application Priority Data

| Aug. 7, 1972 | Japan | 47-92721[U] |
| Aug. 7, 1972 | Japan | 47-92720[U] |
| Aug. 28, 1972 | Japan | 47-100100[U] |
| Oct. 18, 1972 | Japan | 47-119669[U] |
| Oct. 18, 1972 | Japan | 47-119670[U] |
| Oct. 18, 1972 | Japan | 47-119671[U] |
| Nov. 18, 1972 | Japan | 47-132855[U] |

[52] U.S. Cl. ............ 428/31; 52/716; 293/1; 428/99; 428/458; 428/460; 428/462
[51] Int. Cl. ..... B32b 5/18; B60r 13/00; B32b 7/08; B32b 15/08
[58] Field of Search .......... 161/7, 48, 214–215, 161/119, 247, 160, 216, 217, 4–5; 52/716; 293/1

[56] References Cited
UNITED STATES PATENTS

| 2,711,380 | 6/1955 | Pintell | 161/215 |
| 3,543,465 | 12/1970 | Jackson | 52/716 |
| 3,681,180 | 8/1972 | Kent | 161/214 X |
| 3,687,792 | 8/1972 | Ruff | 161/119 X |
| 3,709,770 | 1/1973 | Hale | 161/48 X |
| 3,745,056 | 7/1973 | Jackson | 161/119 X |

Primary Examiner—Philip Dier
Attorney, Agent, or Firm—Connolly and Hutz

[57] ABSTRACT

Decorative synthetic resin braiding constituted by a reflective layer deposited on a rigid synthetic resin base, said base being coated with a clear synthetic resin layer to form the main body of braiding and said main body of braiding being coated with a protective layer of synthetic resin with uniform thickness.

8 Claims, 10 Drawing Figures

DECORATIVE SYNTHETIC RESIN BRAIDING

BACKGROUND OF THE INVENTION

1. Field of the Invention

The present invention relates to a decorative braiding of synthetic resin, more specifically to a protective or decorative braiding to be applied to the side surface of auto body and the like.

2. Brief Description of the Prior Art

The conventional braiding applied to the side surface of auto body for protective or decorative purpose was exclusively made of metal such as stainless steel, but lately a synthetic resin trimming or one which combines stainless steel with synthetic resin has come to be used. Such decorative braiding, however, has drawbacks such as getting rusty with iron particle attached to the atuo body when it is lumped against an obstacle, even if the braiding is of stainless steel; or being heavy on account of being fabricated of metal. Meanwhile, one made of synthetic resin has limitations in the variety of decorative schemes and is found inconvenient on account of its material quality.

SUMMARY OF THE INVENTION

The present invention is aimed at elimination of the above drawbacks.

The primary object of the present invention is to provide a moderately rigid braiding for decorative purpose which can be realized through selection of synthetic resin and aluminum foil.

Another object of the present invention is to provide a decorative braiding that is made of synthetic resin selected such that a constant quality can be maintained for a long period.

Still another object of the present invention is to provide a braiding in which said aluminum foil portion is coated with a clear synthetic resin layer for rust prevention, thereby keeping the decorative effect semi-permanently.

Still another object of the present invention is to provide a braiding which has the shape of its aluminum foil portion selected such that warping due to thermal hysteresis of braiding can be averted.

Still another object of the present invention is to provide a braiding in which said protective layer of elastic synthetic resin is integrated with said clear layer of synthetic resin so that there is no likelihood of said protective layer being torn off.

Stil another object of the present invention is to provide a braiding that can be fitted to the auto body or any other structure by means of a bonding layer or clips.

Still another object of the present invention is to provide a braiding whose ends can be neatly trimmed.

Still another object of the present invention is to provide a braiding characterized by colorfulness and fancifulness of design scheme which is given by application of decorative coating of PVC, leather, etc. on the protective layer.

Still another object of the present invention is to provide a braiding characterized by adequate rigidity which remarkably improves its workability in application to the auto body and the like.

Several other objects of the present invention will become apparent by reading the following description of some embodiments of the present invention with reference to the attached drawings, in which.

Figure 1:
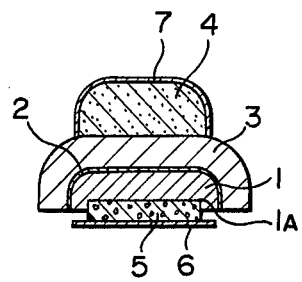
FIG. 1 is a sectional view of the embodiment (1) of the present invention.

As illustrated in FIGS. 1–5, the braiding of the present invention is basically designed in a structure of the following four layers. Namely, a synthetic resin base of flexual rigidity 10,000–40,000 kg/cm$^2$ (as tested in accordance with ASTM D 790-66) made of acrylonitrile butadiene styrene (hereinafter referred to as ABS) resin, polyester resin or polycarbonate resin; a reflective layer of aluminum foil or the like applied on said synthetic resin base; a clear synthetic resin layer applied on top of said reflective layer, which is made of, say, cellulose acetate butyrate resin, or polyvinyl chloride (hereinafter referred to as PVC) resin; and a protective layer of elastic plastic such as hardened PVC resin, foamed PVC resin or various rubbers. To be more specific, in FIG. 1, the base 1 of rigid plastic (in this case, ABS resin) has a groove 1A provided on its underside. In this groove 1A is provided a bonding layer 5 for application of braiding, said bonding layer being constituted by a bonding agent such as polyurethane, neoprene or polybutadiene; or a pressure-sensitive tape which is made adhesive on both sides with use of the above bonding agent; and thereon is stuck a mold-releasing paper 6 which protects the adhesive surface. The top surface of said base 1 is coated with a reflective layer 2 of aluminum foil or the like and thereon is further applied a clear synthetic resin coat 3 of cellulose acetate butyrate or PVC; thereby the end of said clear coat 3 extends over the end of said reflective layer 2 and covers the base 1. Further on top of said clear coat 3 comes a protective layer 4 of elastic, soft PVC and furthermore on top of said protective layer 4 is provided a decorative coat 7 of a patterned and colored PVC film.

Figure 2:
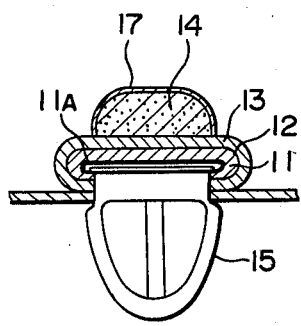
FIG. 2 is a sectional view of the embodiment (2) of the present invention.

The embodiment 2 of FIG. 2, just like the embodiment 1, consists of the base 11, the reflective layer 12, the clear layer 13, the protective layer 14 and the decorative coat 17. In this case, however, the base 1 is provided with a U-shaped groove 11A extending in the longitudinal direction which is intended for attachment of the fitting clip; and instead of the bonding layer in the embodiment 1, the clip 15 is employed.

Figure 3:
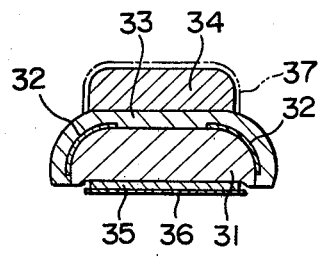
FIG. 3 is a sectional view of the embodiment (3) of the present invention.

In the embodiment 3 of FIG. 3, reflective layers 32 are attached to both shoulders of the base 31 made of rigid plastic; and covering these reflective layers 32, 32 and the base 31 there is provided the clear layer 33 of transparent plastic like cellulose acetate butyrate resin. On top of this clear layer 33 is applied the protective layer 34 of elastic, hardened PVC resin; and this protective layer 34 is coated with a patterned, colored PVC film for decoration. Further in this example the underside of the base is provided with a bonding layer 35 and a mold-releasing paper 36; and in this example the same clip fastening means as in the example of FIG. 2 can also be adopted.

Figure 4:
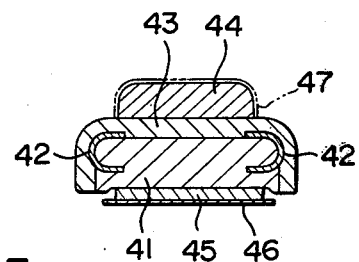
FIG. 4 is a sectional view of the embodiment (4) of the present invention.

In the embodiment 4 of FIG. 4, the reflective layers 42, 42 are applied to both shoulders of the base 41 made of rigid plastic (say, ABS resin); and the rims of these layers are tucked into the base 41, thereby making the reflective layer 42 U-letter in form. Over these reflective layers 42 and the base 41 come a clear layer 43 of cellulose acetate butyrate resin and on top of this clear layer is applied a protective layer 44 of elastic, soft PVC resin; and said protective layer 44 is further coated with a decorative film 47, which, if necessary, is patterned or colored. In this case, too, the underside of the base 41 is provided with a bonding layer 45 and a mold-releasing paper 46 and in the same way as in the embodiment of FIG. 3, a clip-fastening means may be adopted.

Figure 5:
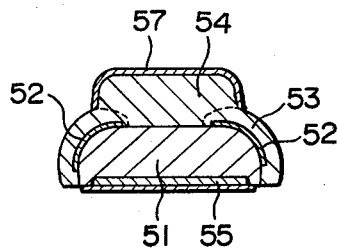
FIG. 5 is a sectional view of the embodiment (5) of the present invention.

In the embodiment 5 of FIG. 5, reflective layers 52, 52 are attached to the shoulders of the base 51 made of rigid plastic (say, ABS resin) and these reflective layers are covered with a clear layer of cellulose acetate butyrate resin or soft PVC resin.

The central portion of the top surface of said clear layer 53 projects and there a protective layer 54 is integrally provided; further said protective layer 54 is coated with a decorative film 57 of soft PVC, patterned and colored. As a variation of the embodiment 5, the reflective layers 52 at both shoulders of the base 51 may be covered with a clear layer 53; and then a protective layer 54 may be directly provided on the portion of the base 51 between a clear layer 53 and a clear layer 53. When the clear layer 53 is of the same material, say soft PVC resin, as the protective layer 54, both the clear layer 53 and the protective layer 54 can be integrated with the base 51 and these reflective layers 52. In this case, the fastening means of the underside of the base is not restricted to the bonding layer 55, but a clip may be adopted just as in the embodiment 3.

The base, reflective layers, clear layer and protective layer in these embodiments can be simultaneously and integrally obtained by extrusion molding. Extrusion molding is found the most reasonable method of production and the different shapes of these layers can be obtained depending on the tip profile of the die to be used; therefore the shapes illustrated in FIGS. 1–5 are nothing restrictive. Meanwhile, said bonding layer may be applied at the same time as said extrusion molding or may be applied when the finished braiding is actually employed.

Figure 6B:
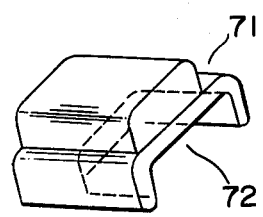
FIG. 6B is an oblique view of the terminal piece employed in the present invention.
Figure 6A:
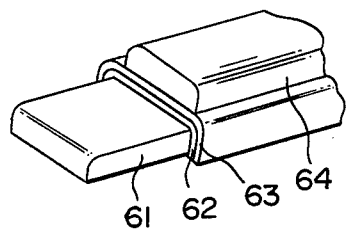
FIG. 6A is an oblique view of the end of braiding.
Figure 7:
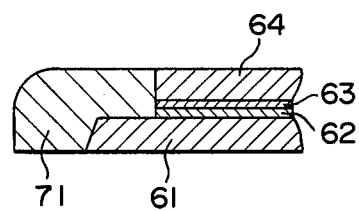
FIG. 7 is a longitudinal section view (as deposited) of the end of braiding according to the present invention.

As illustrated in FIGS. 6 and 7, the braiding terminals can be ornamented with a terminal piece 71 of the same synthetic resin as the one which constitutes the base 61, said piece being bonded or deposited by ultrasonics or high frequency wave. In this case, as illustrated in FIG. 6A, the reflective layer 62, clear layer 63 and protective layer 64 over the base 61 are stripped off to a specified length, exposing the base 61; and after fitting a terminal piece 71, plated or colored and patterned, with a groove 72 having the same sectional form as the base 61, it is bonded or deposited as illustrated in FIG. 7.

The braiding according to the present invention can be fastened to the side surface of auto body, etc. by means of a bonding agent or clips provided in the groove cut on the underside of the base, as shown in FIGS. 1 and 2.

Figure 8:
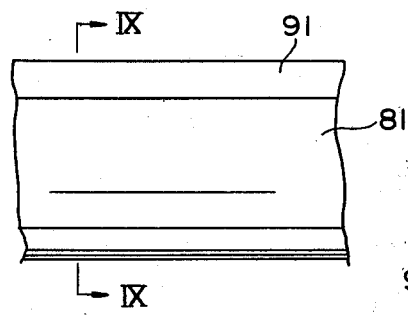
FIG. 8 is a plan view of the braiding.
Figure 9:
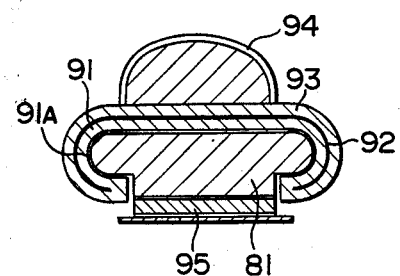
FIG. 9 is a view showing the braiding of FIG. 8 in the section at IX—IX.

When, however, the fixture 81 as illustrated in FIGS. 8 and 9 is adopted for this purpose, adjustment can be made for the expansion and contraction of the braiding due to thermal hysteresis. In the same Figures, the fixture 81 on the base 91 of a synthetic resin braiding consisting of the base 91, the reflective layer 92, the clear layer 93 and the protective layer 94 is provided in the decorative groove 91A. Said fixture 81 has a portion matching the profile of said groove 91A and when it is attached to the braiding, the bottom of said fixture 81 projects out of said groove and the bonding layer 95 is applied to this projection. It is desirable that said fixture 81 be 3–10 cm long and made of synthetic resin. It is desirable that the bonding layer 95 be constituted by an adhesive tape sticky on both sides which is a sponge tape coated on both sides with a bonding agent or a tape of neoprene, polyurethane or butyl rubber.

In the synthetic resin braiding of this invention, as described above, the base can maintain its shape and yet it is moderately elastic, because it is made of rigid synthetic resin like ABS resin; the gloss, pattern and color of the bright layer do not change with no scratching, because the aluminum foil which constitutes the layer is protected with a clear synthetic resin; in the examples of FIGS. 3–5, where the aluminum foil is cambered and particularly in the example of FIG. 4, where the reflective layers attached on both sides of the braiding are formed in U-letter, there is no likelihood of such a warping as occurs in a bimetal, due to the difference in the coefficient of linear expansion between the reflective layer 42 and synthetic resin; and the protective layer 44 by virtue of its elasticity protects the auto body, when it bumps against any object, from the shock. Moreover, in the case of FIG. 5, since the protective layer 54 and the base 51 are closely integrated, the braiding will not break even when it suffers a shock.

Meanwhile, bonding or deposition of synthetic resin of identical quality at the braiding terminal assures a neat finishing of the terminal without any formation of stagger due to hot press on any spoiling of pattern or color.

Use of the fixture 81 in FIG. 9 makes it possible to prevent rusting; the grooved portion between the fixtures can act as a buffer which adds to the cushioning effect of the protective layer 94; and moreover, the displacement of the braiding due to heating can be absorbed at the fixture 81.

Since the greater part is synthetic resin, the braiding of this invention is light, convenient to handle, easy to produce by extrusion molding; and accordingly it can be offered at a very low price.

What is claimed is:

1. A synthetic resin braiding applicable to the side surface of an automobile body for its protection and decoration comprising a base of rigid plastic having opposite shoulder portions, a pair of spaced apart reflective layers superimposed and laminated to the base of rigid plastic, one at each shoulder portion thereof, a clear synthetic resin layer superimposed and laminated to the reflective layers, and a protective layer of synthetic resin superimposed and laminated to a portion of the top of the clear layer whereby the clear synthetic layer has a partially exposed surface.

2. A synthetic resin braiding as in claim 1 including a bonding layer on the underside of the base for attachment of the braiding.

3. A synthetic resin braiding as in claim 1 including an attaching clip on the underside of the base for attachment of the braiding.

4. A synthetic resin braiding as in claim 1 wherein the base is fabricated of material selected from the group consisting of acrylonitrile butadiene styrene resin, polyester resin and polycarbonate resin with a flexural rigidity ranging from 10,000 to 40,000 kg/cm².

5. A synthetic resin braiding as in claim 1 wherein the clear synthetic resin layer is selected from the group consisting of cellulose acetate butyrate resin and polyvinyl chloride resin.

6. A synthetic resin braiding as in claim 1 wherein the protective layer is selected from the group consisting of soft polyvinyl chloride resin, foamed polyvinyl chloride resin and rubber.

7. A synthetic resin braiding as in claim 1 wherein each reflective layer is U-shaped, with one end embedded within one of the shoulder portions of the base and the other end attached to the exterior of the base.

8. A synthetic resin braiding as in claim 1 wherein the reflective layers comprise aluminum foil.

* * * * *